(12) United States Patent
Sheehy et al.

(10) Patent No.: US 6,485,142 B1
(45) Date of Patent: Nov. 26, 2002

(54) ARTIFICIAL HUMAN EYE AND TEST APPARATUS

(75) Inventors: James B. Sheehy, Leonardtown, MD (US); Kenneth W. Gish, Pipersville, PA (US); John J. Sprenger, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 90 days.

(21) Appl. No.: 09/672,748

(22) Filed: Sep. 28, 2000

(51) Int. Cl.[7] ................................................. A61B 3/00
(52) U.S. Cl. ....................................... 351/203; 434/271
(58) Field of Search ................................ 351/203, 205, 351/206, 221, 211; 434/271; 623/4.1; 446/389

(56) References Cited

U.S. PATENT DOCUMENTS 4,834,528 A * 5/1989 Howland et al. ............ 351/211
4,865,552 A * 9/1989 Malonry et al. ............ 434/271

* cited by examiner

*Primary Examiner*—George Manuel
(74) *Attorney, Agent, or Firm*—Ron Billi

(57) ABSTRACT

An artificial eye includes a generally spherically shaped container including a substantially hemispherical posterior portion, a substantially hemispherical anterior portion and a fastener for attaching the posterior portion to the anterior portion. The artificial eye includes functional counterparts to the anterior and posterior chambers of the human eye. Within these chambers are fluids which mimic the characteristics of the aqueous and vitreous humors in the human eye. Protective eyewear is tested by placing the eyewear between the artificial eye and a source of radiation. Radiation is directed through the protective eyewear and then through the artificial eye. The radiation is then received by a sensing device such as a charged couple device (CCD) camera or optometer. The resulting image is then evaluated.

22 Claims, 5 Drawing Sheets

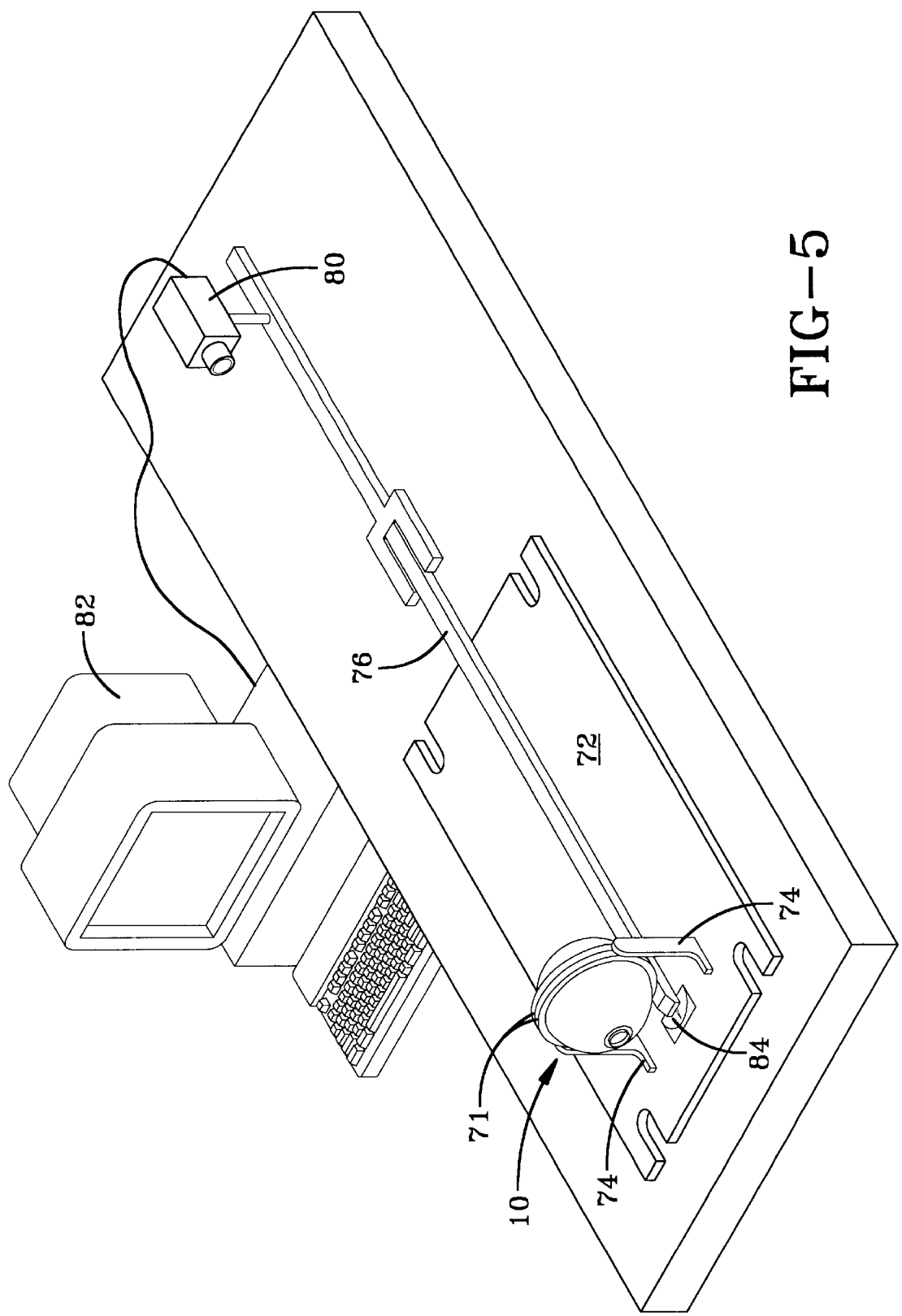

ARTIFICIAL HUMAN EYE AND TEST APPARATUS

BACKGROUND OF THE INVENTION

The invention relates in general to an artificial human eye and in particular to an artificial human eye for testing the effectiveness of protective eyewear against harmful radiation.

Attempts have been made previously to simulate the function of the human eye with models. U.S. Pat. No. 1,630,944, issued to L. R. Ingersoll on May 31, 1927 includes lenses to represent the cornea and lens, and a curved metal plate which serves as the retina. A single water filled chamber represents both the aqueous and vitreous humors of the eye. An external image is projected through the lenses and water onto the metal plate. U.S. Pat. No. 2,068,950, issued to F. Hamilton on Jan. 26, 1937 is directed to an artificial eye with a single lens which represents the human cornea. Two curved sections form a hollow shell which approximates the shape of the human eye. An opening in one section houses the lens. In a second embodiment, a solid glass portion which is nearly a complete sphere approximates the shape of the human eye. A second glass portion completes the sphere and constitutes the lens. However, the above-described artificial eyes do not provide a satisfactory device with the proper refractive indices and power to simulate the form and function of a human eye.

There have been two main methods for testing the effectiveness of protection for shielding the human eye against harmful radiation. One method uses laboratory animals such as rabbits and monkeys. Using animals is disadvantageous because it is costly and time consuming to house and train the animals. Furthermore it is painful to the animals and can be a controversial public relations issue. A second method utilizes extrapolated data from tests on human subjects in which the radiation strength is well below a hazardous level. This method is of limited value because there is always the question of unexpected effects that may arise as the level of radiation increases. This uncertainty is of particular concern when the protective properties of the eyewear is not a linear function of the intensity of the radiation.

SUMMARY OF THE INVENTION

It is an object of the present invention to provide an artificial eye that is an enlarged, scaled functional replica of the human eye.

It is another object of the present invention to provide an artificial eye including fluids which mimic the aqueous and vitreous humors of the human eye.

It is yet another object of the present invention to provide an artificial eye including variable apertures and lenses which mimic the human pupil, cornea and lens.

It is still another object of the present invention to provide an artificial eye which can simulate characteristics of the human eye such as near or far sightedness and age.

It is a further object of the invention to provide an apparatus for testing protective eyewear which precludes the use of humans and animals, is less costly, and more accurate than previous designs.

These and other objects of the invention are achieved by an artificial eye comprising a generally spherically shaped container; a lens holder removably disposed in a first opening in the container; a first fluid disposed in the container; and a second fluid disposed in the lens holder.

The generally spherically shaped container comprises a substantially hemispherical posterior portion made of a substantially transparent material, a substantially hemispherical anterior portion made of a substantially opaque material and a fastener for attaching the posterior portion to the anterior portion.

Preferably, the substantially transparent material comprises plexiglass, the substantially opaque material comprises one of aluminum and stainless steel and the fastener comprises two bands of aluminum.

In a preferred embodiment, the interior surface of the substantially hemispherical posterior portion is frosted.

Another aspect of the invention is a test apparatus comprising a radiation source; a device to be tested disposed in a path of radiation from the radiation source; an artificial eye disposed in a path of radiation from the device to be tested; an image receiving device for receiving the image created in the artificial eye; and an image processor for processing an electronic image from the image receiving device into a human readable image.

Preferably, the image receiving device is one of a charged couple device camera and an optometer.

Further objects, features and advantages of the invention will become apparent from the following detailed description taken in conjunction with the drawing.

BRIEF DESCRIPTION OF THE DRAWINGS

FIG. 5 is a perspective view of another test apparatus of the present invention.

DETAILED DESCRIPTION OF THE PREFERRED EMBODIMENTS

Figure 1:
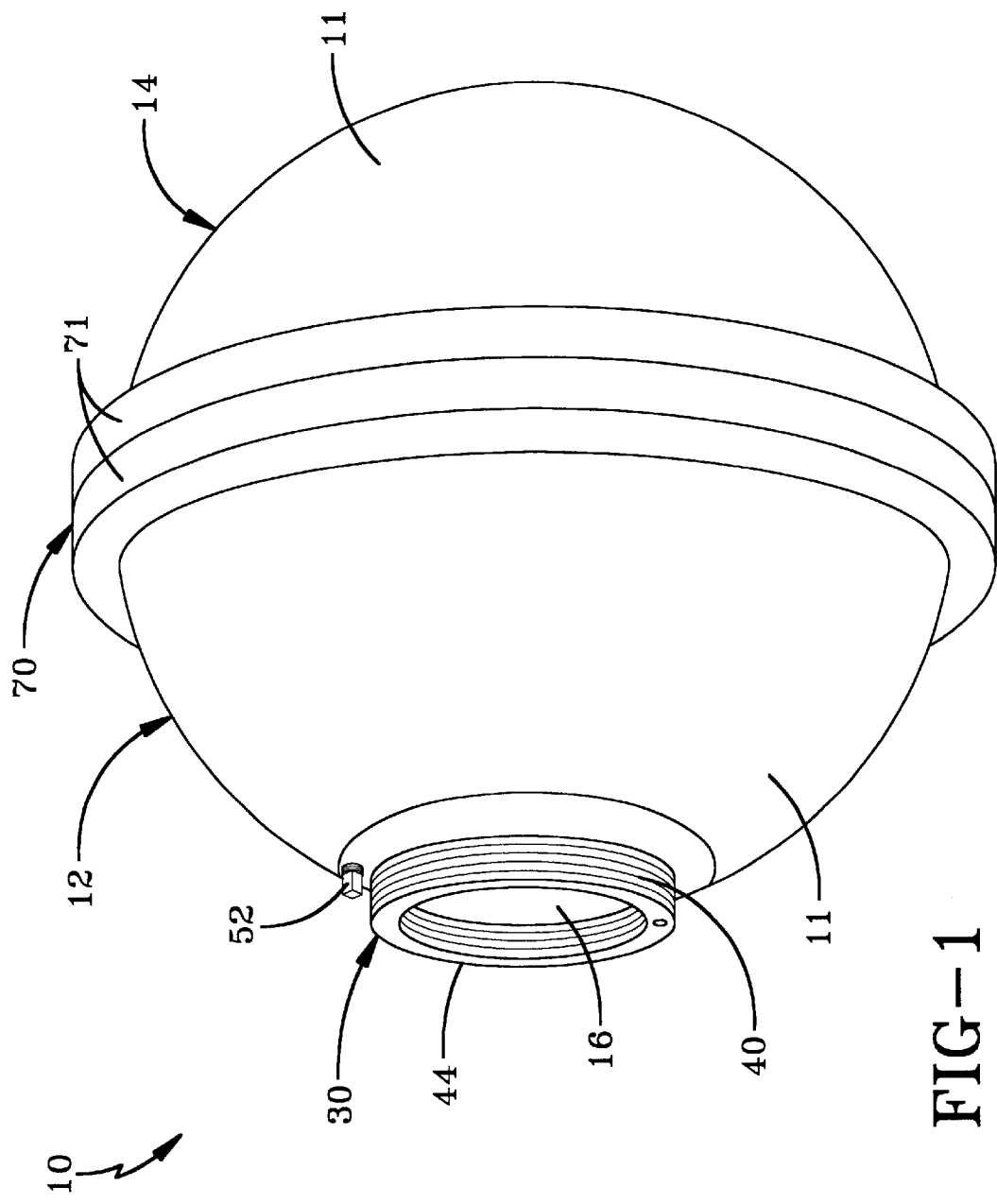
FIG. 1 is a perspective view of an artificial eye according to the present invention.

One aspect of the present invention is a functional replica of the human eye. In general, the artificial eye of the invention includes a generally spherically shaped container comprised of a substantially hemispherical posterior portion, a substantially hemispherical anterior portion and a fastener for attaching the posterior portion to the anterior portion. The artificial eye includes functional counterparts to the anterior and posterior chambers of the human eye. Within these functional counterparts are fluids which mimic the characteristics of the aqueous and vitreous humors of the human eye.

An adjustable lens holder fits within the generally spherically shaped container and includes a first lens, which simulates the human cornea; an aperture, to simulate the human pupil; and a second lens, which simulates the human lens. The lenses seal a chamber in the adjustable lens holder that corresponds to the anterior chamber of the human eye. External images pass through the first lens (cornea), fluid (aqueous) and a second lens and are focused on the posterior hemisphere of the spherical container, which simulates the human retina.

Protective eyewear is tested by placing the eyewear between the artificial eye and a source of radiation. Radiation is directed through the protective eyewear and then into the artificial eye. The radiation is then received by a sensing device such as a charged couple driver (CCD) camera or optometer. The resulting image is then evaluated.

Throughout the Figures, like reference numerals refer to like features.

Figure 2:
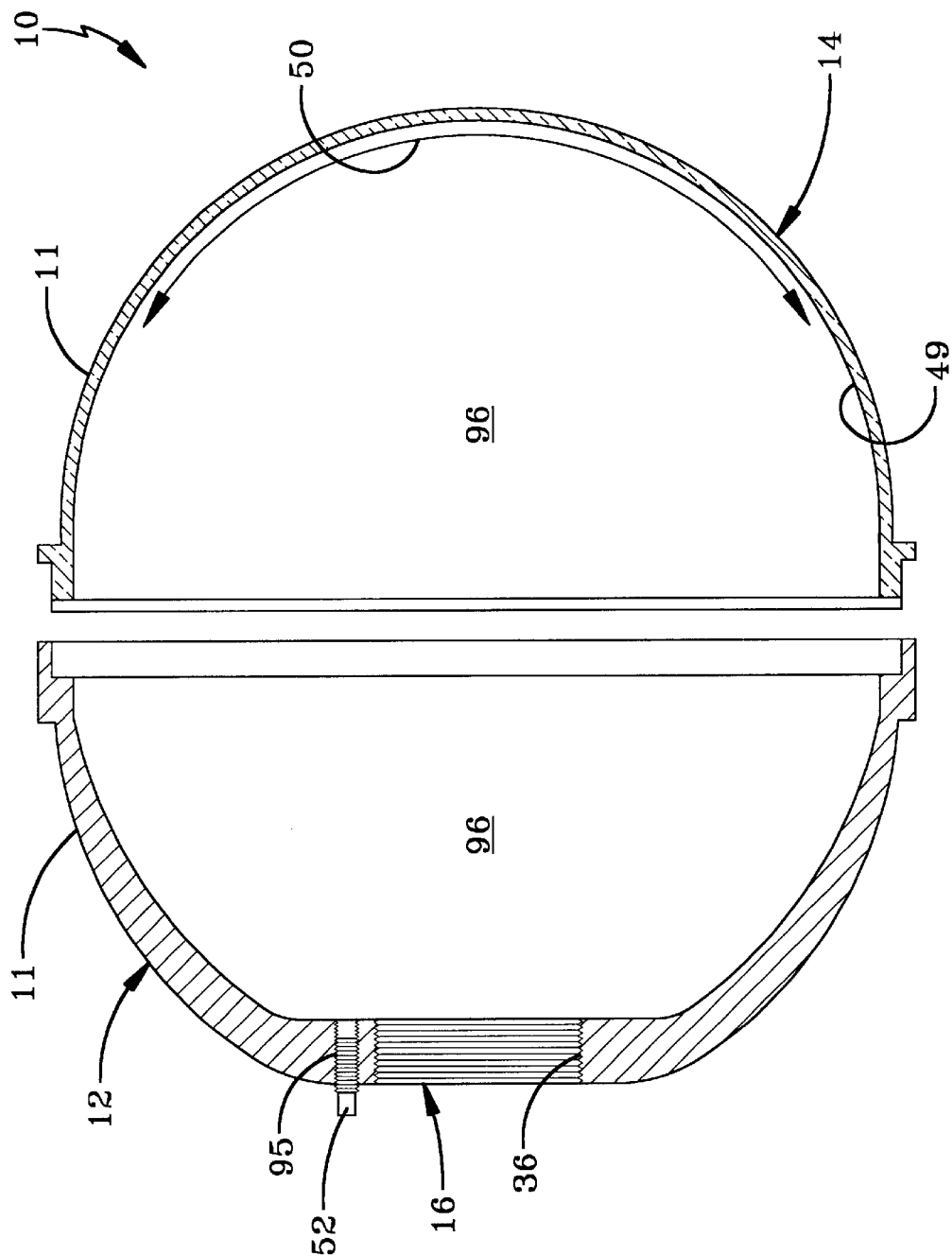
FIG. 2 is a cross-sectional view of the artificial eye of FIG. 1.

FIG. 1 is a perspective view of an artificial eye according to the present invention. FIG. 2 is a cross-sectional view of the artificial eye of FIG. 1. As shown in FIGS. 1 and 2, the artificial eye 10 includes a generally spherically shaped container 11. The generally spherically shaped container 11 includes a lens holder 30 (see FIG. 3) removably disposed in an opening 16 in the container 11. In a preferred embodiment, a plug 52 is removably disposed in an opening 95 in the container 11. A first fluid 96 fills the container 11. A second fluid 94 is disposed in the lens holder 30.

The generally spherically shaped container 11 includes a substantially hemispherical anterior portion 12 and a substantially hemispherical posterior portion 14. A fastener 70 joins the anterior portion 12 and the posterior portion 14. A seal (not shown) made of for example, rubber, is preferably placed between the anterior and posterior portions 12, 14. In a preferred embodiment, the fastener 70 comprises two bands 71 made of, for example, anodized aluminum. The fastener 70 is shown only in. FIG. 1. Preferably, the container 11 is approximately 6.5 times the size of the human eye (about 14.58 cm in diameter). Other sizes are possible, as long as the proportions of the human eye are maintained. The anterior portion 12 is made of a substantially opaque material, for example, milled from stainless steel or aluminum. The posterior portion 14 is made of a substantially transparent material, for example, plexiglass. Preferably, the interior surface 49 of the posterior portion 14, which corresponds to the retina of the human eye, is frosted (translucent). The frosted interior portion of the posterior portion 14 constitutes an image plane 50.

Figure 3:
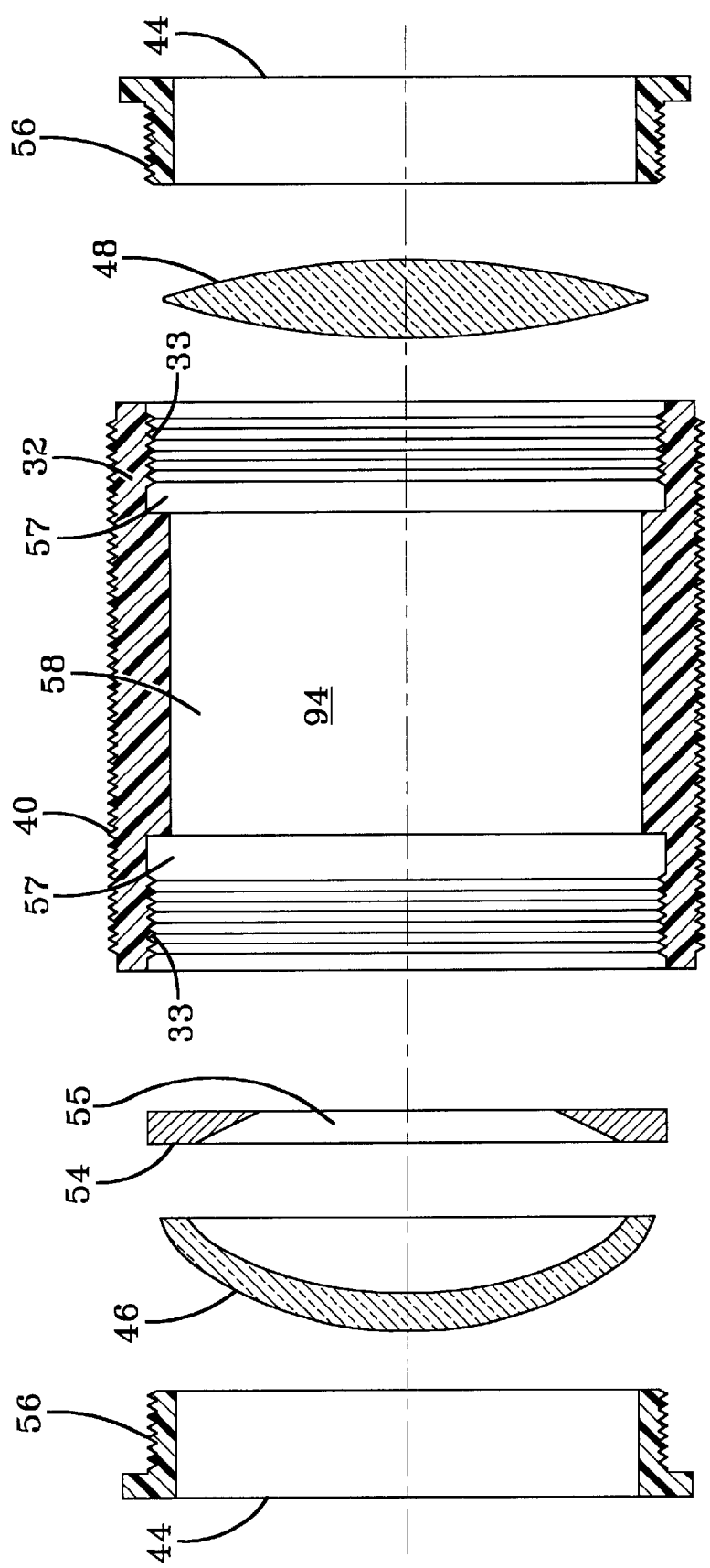
FIG. 3 is an exploded view of the lens holder.

FIG. 3 is an exploded view of the lens holder 30. The lens holder 30 includes a generally cylindrical sleeve 32 with external threads 40 on its exterior surface. The threads 40 allow the lens holder 30 to be adjustably attached to the container 11, which includes internal threads 36 at the opening 16.

The lens holder 30 includes a first lens 46 that functionally simulates the human cornea. An aperture disk 54 having an aperture 55 is disposed within the sleeve 32 posterior to the first lens 46. A second lens 48 is disposed posterior to the aperture disk 54. The aperture disk 54 functionally simulates the human iris. The aperture 55 functionally simulates the human pupil. The second lens 48 functionally simulates the human lens.

Preferably, the first lens 46 is a meniscus lens and the second lens 48 is a double convex lens. These shapes best mimic the shape and performance of the human cornea and lens, respectively. The first and second lenses 46,48 are preferably 5 cm in diameter so that commercially available lenses may be used. The artificial eye's refractive state is adjustable by varying the power of first lens 46 or second lens 48 or by adjusting the distance of the lens holder 30 from the interior surface of the posterior portion 14.

The aperture disk 54 may be milled from 2.3 mm thick, black anodized aluminum. Preferably, the aperture disk 54 has tapered edges to reduce unwanted diffraction. Different human pupil sizes are simulated by varying the size of aperture 55. For example, six human pupil sizes ranging from 2 to 6.5 mm may be simulated using six scaled aperture disks 54 having apertures 55 of 12, 18, 24, 30, 36 and 42 mm. Other shapes and sizes may also be used provided the proportions of the human eye are maintained.

End pieces 44 enclose the elements within the sleeve 32. Preferably, the end pieces 44 are annular rings having central openings. The end pieces 44 include threaded outer surfaces 56 which screw into threads 33 on the interior surface of sleeve 32. Backing rings 57 formed on the interior of the sleeve 32 provide a positive stop for positioning the first lens 46 and aperture disk 54 at one end and the second lens 48 at the other end of the sleeve 32.

The lens holder 30 is filled with the second fluid 94 by unscrewing either end piece 44 and removing the adjacent components. The second fluid 94 is then poured into the sleeve 32. The adjacent components and end piece 44 are then replaced. The first and second lenses 46, 48 form fluid-tight seals with the sleeve 32 and define a chamber 58 that corresponds to the anterior chamber of the human eye. Preferably, the sleeve 32 and the end pieces 44 are made of phenolic resin.

The interior volume of the container 11 corresponds to the posterior chamber of the human eye. The relative volumes of the chamber 58 in the lens holder and the interior of the container 11 approximate the relative volumes of the anterior and posterior chambers of the human eye, respectively. The chamber 58 in the lens holder 30 is filled with a fluid 94, for example, water. The fluid 94 simulates the aqueous humor of the human eye. The interior volume of the container 11 is filled with a fluid 96. Preferably, the fluid 96 has the same index of refraction as the vitreous humor of the human eye. The fluid 96 may be made, for example, by mixing gelatin and water. The interior of the container 11 is filled through opening 95 which is closed with a plug 52. Alternatively, the opening 95 and plug 52 may be omitted and the container 11 filled through the opening 16. Because the indices of refraction are known for healthy, aged, and diseased human eyes, these conditions can be simulated by changing the indices of refraction of the fluids 94 and 96.

Figure 4:
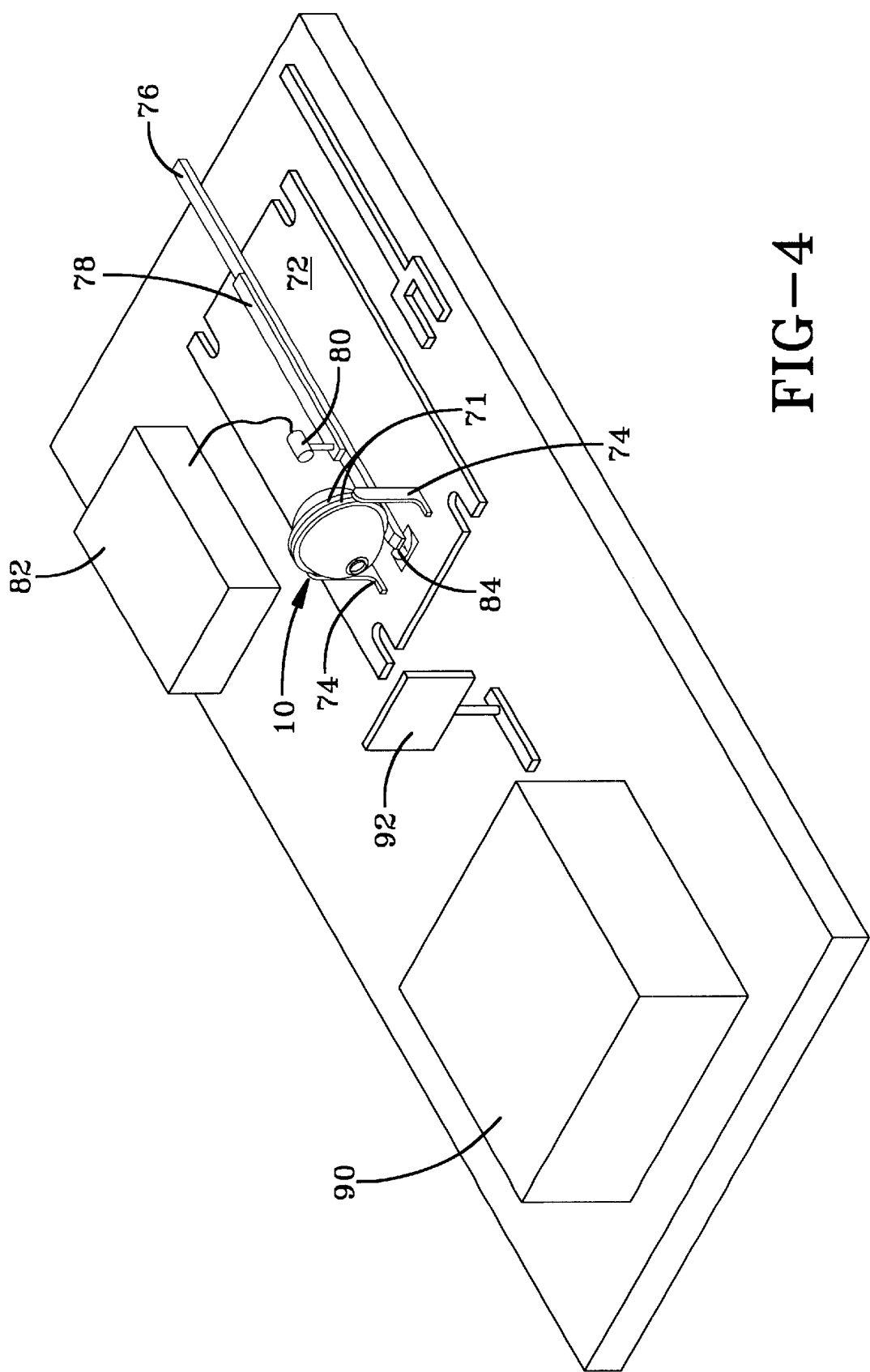
FIG. 4 is a perspective view of a test apparatus of the present invention.

FIGS. 4 and 5 are perspective views of test apparatus of the present invention. The test apparatus are used to test, for example, radiation-protective eyewear. A radiation source 90 directs radiation towards an artificial eye 10. In a preferred embodiment, the radiation source 90 emits high intensity laser radiation, however, other forms of radiation ranging from visible light to infra-red may be used. The radiation first passes through a device to be tested, for example, protective filter or eyewear 92. Although not shown in FIG. 5, the radiation source 90 and the device 92 to be tested are also part of the test apparatus of FIG. 5.

Protective eyewear 92 filters some of the radiation, and the filtered radiation is then received by the artificial eye 10. The filtered radiation passes through the components of the lens holder 30 including the first lens 46, the aperture 55 in aperture disk 54, the fluid 94 and the second lens 48. In this manner, the operation of the cornea, iris and pupil, aqueous humor, and lens of the human eye are respectively simulated. The filtered radiation then continues through the second fluid 96, which simulates the vitreous humor of the human eye.

The artificial eye 10 is pivotally mounted at the anterior band 71 (see FIG. 1) to * posts 74, which extend from a base plate 72. The pivotal mounting enables the eye 10 to be tilted upward and downward to facilitate the injection of fluids and the changing of the lenses and apertures. A first rod 76 is horizontally pivotally mounted to the base plate 72 directly below the center of the eye 10 to ensure that rotation of the sensor 80 matches the curvature of the simulated retina 49. Preferably, the first rod 76 is made of steel. A preferred size of the rod 76 is 2.5×93 cm. In the embodiment shown in FIG. 4, a second rod 78 is mounted on top of the first rod 76. A preferred size of the second rod 78 is 1.7 cm wide and 60 cm long. The second rod 78 is preferably fabricated from anodized aluminum or steel.

After passing through the fluid 96, the filtered radiation may be received by an image-receiving device 80, which is mounted to either the second rod 78 (FIG. 4) or the first rod 76 (FIG. 5). A protractor 84 may be mounted in an opening in the base plate 72 under the artificial eye 10. The protractor 84 indicates the angular position of the first and second rods 76,78 and, consequently, the angular position of the image-receiving device 80 relative to the artificial eye 10. Preferably, the image-receiving device 80 is a CCD camera, optometer, or other type of radiometer which can detect the filtered radiation and create a high resolution map of the radiation pattern in electronic form.

The image-receiving device 80 relays the electronic interpretation of the radiation pattern to an image processor or computer 82. The image processor 82 translates the electronic map into an image which can be understood by humans. In a preferred embodiment, the electronic map is converted into a high resolution printout or is displayed on a screen. The person evaluating the image determines whether or not the image intensity is below a predetermined safety threshold at all points. By mapping the intensity at each point of the image, rather than determining the total energy of the filtered radiation, the present invention reveals concentrations of energy which may damage the eye.

While the invention has been described with reference to certain preferred embodiments, numerous changes, alterations and modifications to the described embodiments are possible without departing from the spirit and scope of invention as defined in the appended claims, and equivalents thereof.

What is claimed is:

1. An artificial eye, comprising:
   a generally spherically shaped container having a first opening;
   a lens holder removably disposed in the first opening in the container;
   a first fluid disposed in the container; and
   a second fluid disposed in the lens holder;
   wherein the generally spherically shaped container comprises a substantially hemispherical posterior portion made of a substantially transparent material, a substantially hemispherical anterior portion made of a substantially opaque material and a fastener for attaching the posterior portion to the anterior portion.

2. The artificial eye of claim 1 wherein the first fluid has substantially the same index of refraction as the vitreous humor of the human eye.

3. The artificial eye of claim 2 wherein the first fluid comprises a mixture of gelatin and water.

4. The artificial eye of claim 1 wherein the lens holder comprises a substantially cylindrical sleeve, a first lens disposed in the sleeve, an aperture disk disposed posterior to the first lens, a second lens disposed posterior to the aperture disk and end pieces disposed in both ends of the sleeve.

5. The artificial eye of claim 4 wherein the sleeve includes internal backing rings against which the second lens and the aperture disk rest.

6. The artificial eye of claim 5 wherein the first lens, the second lens and the sleeve define a chamber which is filled with the second fluid.

7. The artificial eye of claim 6 wherein the second fluid has substantially the same index of refraction as the aqueous humor of the human eye.

8. The artificial eye of claim 7 wherein the second fluid comprises water.

9. The artificial eye of claim 6 wherein the first lens comprises a meniscus lens.

10. The artificial eye of claim 9 wherein the second lens comprises a double convex lens.

11. An artificial eye, comprising:
    a generally spherically shaped container having a first opening;
    a lens holder removably disposed in the first opening in the container;
    a first fluid disposed in the container; and
    a second fluid disposed in the lens holder;
    wherein the generally spherically shaped container comprises a substantially hemispherical posterior portion made of a substantially transparent material, a substantially hemispherical anterior portion made of a substantially opaque material and a fastener for attaching the posterior portion to the anterior portion and wherein the substantially transparent material comprises plexiglass, the substantially opaque material comprises one of aluminum and stainless steel and the fastener comprises two bands of aluminum.

12. An artificial eye, comprising:
    a generally spherically shaped container having a first opening;
    a lens holder removably disposed in the first opening in the container;
    a first fluid disposed in the container; and
    a second fluid disposed in the lens holder;
    wherein the generally spherically shaped container comprises a substantially hemispherical posterior portion made of a substantially transparent material, a substantially hemispherical anterior portion made of a substantially opaque material and a fastener for attaching the posterior portion to the anterior portion and wherein the substantially hemispherical posterior portion further comprises an interior surface that is frosted.

13. An artificial eye, comprising:
    a generally spherically shaped container having a first opening;
    a lens holder removably disposed in the first opening in the container;
    a first fluid disposed in the container; and
    a second fluid disposed in the lens holder;
    wherein the container is approximately 6.5 times the size of a human eye.

14. An artificial eye, comprising:
    a generally spherically shaped container having a first opening;
    a lens holder removably disposed in the first opening in the container;
    a first fluid disposed in the container; and
    a second fluid disposed in the lens holder;
    wherein the generally spherically shaped container comprises a substantially hemispherical posterior portion made of a substantially transparent material, a substantially hemispherical anterior portion made of a substantially opaque material and a fastener for attaching the posterior portion to the anterior portion and wherein the lens holder comprises a substantially cylindrical sleeve, a first lens disposed in the sleeve, an aperture disk disposed posterior to the first lens, a second lens disposed posterior to the aperture disk and end pieces disposed in both ends of the sleeve and further wherein an external surface of the sleeve and an internal surface of the first opening in the container are threaded so that the distance between the lens holder and the interior surface of the substantially hemispherical posterior portion may be adjusted.

15. An artificial eye, comprising:

a generally spherically shaped container having a first opening;

a lens holder removably disposed in the first opening in the container;

a first fluid disposed in the container; and a second fluid disposed in the lens holder;

wherein the container includes a second opening, the artificial eye further comprising a plug removably disposed in the second opening in the container.

16. A test apparatus, comprising:

a radiation source;

a device to be tested disposed in a path of radiation from the radiation source;

an artificial eye disposed in a path of radiation from the device to be tested;

an image receiving device for receiving the image created in the artificial eye; and an image processor for processing an electronic image from the image receiving device into a human readable image.

17. The test apparatus of claim 16 wherein the image receiving device is one of a charged couple device camera and an optometer.

18. The test apparatus of claim 16 wherein the human readable image is one of a high resolution printout or a screen display.

19. A test apparatus, comprising:

a radiation source;

a device to be tested disposed in a path of radiation from the radiation source;

an artificial eye disposed in a path of radiation from the device to be tested;

an image receiving device for receiving the image created in the artificial eye; and an image processor for processing an electronic image from the image receiving device into a human readable image; wherein the device to be tested comprises radiation protective eyewear.

20. A test apparatus, comprising:

a radiation source;

a device to be tested disposed in a path of radiation from the radiation source;

an artificial eye disposed in a path of radiation from the device to be tested;

an image receiving device for receiving the image created in the artificial eye;

an image processor for processing an electronic image from the image receiving device into a human readable image; and a base plate and a pair of posts mounted on the base plate wherein the artificial eye is pivotally mounted to the pair of posts.

21. The test apparatus of claim 20 further comprising a first rod horizontally pivotally mounted the base plate directly below a center of the artificial eye and a second rod mounted on the first rod wherein the image receiving device is mounted on the second rod.

22. The test apparatus of claim 21 further comprising a protractor mounted to the base plate for indicating the angular position of the image receiving device with respect to the artificial eye.

* * * * *